(12) United States Patent
Hasegawa

(10) Patent No.: US 7,344,400 B2
(45) Date of Patent: Mar. 18, 2008

(54) TERMINAL CONNECTION STRUCTURE OF MOTOR INCORPORATED WITHIN A COMPRESSOR

(75) Inventor: Takehiro Hasegawa, Isesaki (JP)

(73) Assignee: Sanden Corporation, Gunma (JP)

( * ) Notice: Subject to any disclaimer, the term of this patent is extended or adjusted under 35 U.S.C. 154(b) by 128 days.

(21) Appl. No.: 11/229,723

(22) Filed: Sep. 20, 2005

(65) Prior Publication Data
US 2006/0068626 A1    Mar. 30, 2006

(30) Foreign Application Priority Data
Sep. 29, 2004    (JP)    ............................. 2004-284424

(51) Int. Cl.
H01R 13/52    (2006.01)
(52) U.S. Cl. ..................................... 439/276
(58) Field of Classification Search ................ 439/685, 439/276
See application file for complete search history.

(56) References Cited
U.S. PATENT DOCUMENTS

| | | | | |
|---|---|---|---|---|
| 3,721,948 A | * | 3/1973 | Brandt et al. ................ | 439/695 |
| 4,523,798 A | * | 6/1985 | Barrows et al. ............ | 439/685 |
| 4,966,559 A | * | 10/1990 | Wisner ........................ | 439/566 |
| 5,199,898 A | * | 4/1993 | Wisner ........................ | 439/367 |
| 5,336,105 A | * | 8/1994 | Wisner ........................ | 439/367 |
| 6,372,993 B1 | * | 4/2002 | Eckels et al. ......... | 174/152 GM |
| 6,441,311 B2 | * | 8/2002 | Fukumoto et al. ....... | 174/138 F |
| 6,851,962 B2 | * | 2/2005 | McCormack, III .......... | 439/276 |
| 6,910,904 B2 | * | 6/2005 | Herrick et al. .............. | 439/271 |
| 7,025,614 B2 | * | 4/2006 | Herrick et al. .............. | 439/276 |
| 2001/0005659 A1 | * | 6/2001 | Fukumoto et al. .......... | 439/892 |
| 2002/0049004 A1 | * | 4/2002 | Davis et al. ................. | 439/685 |
| 2002/0155741 A1 | * | 10/2002 | Herrick et al. .............. | 439/199 |
| 2005/0124203 A1 | * | 6/2005 | Herrick et al. .............. | 439/367 |

* cited by examiner

Primary Examiner—Ross N. Gushi
(74) Attorney, Agent, or Firm—Baker Botts L.L.P.

(57) ABSTRACT

A terminal connection structure of a motor incorporated within a compressor for connecting feed terminals for a stator of a motor to the compressor includes a lid, which is attached to a compressor body portion for securing external feed terminals with a hermetic seal. The terminal connection structure is provided with a resin chamber on an inner surface of the lid, through which the external feed terminals extend, and a resin housing containing wire-side terminals, which are provided at ends of wires connected to the stator and which are connected to the external feed terminals. In the structure, superior insulation properties may be obtained even if the compressor size is reduced, and the productivity and assembling performance of the compressor may be improved.

6 Claims, 3 Drawing Sheets

TERMINAL CONNECTION STRUCTURE OF MOTOR INCORPORATED WITHIN A COMPRESSOR

BACKGROUND OF THE INVENTION

1. Field of the Invention

The present invention relates to a terminal connection structure of a motor incorporated within a compressor, such as a motor-driven compressor or a hybrid compressor, and more specifically, to a terminal connection structure for improving insulation properties of the terminal connection portion, facilitating manufacture of the compressor, and reducing the compressor's size.

2. Description of Related Art

In a motor incorporated within a compressor, a stator of the motor is disposed in a compressor body. To supply power to the stator, external feed terminals are provided on an outer surface, such as a radial or side surface, of the compressor body, and wire-side terminals, which are provided at the ends of wires connected to the stator, are connected to the external feed terminals. Because a high-voltage motor is used as the motor incorporated within a compressor, such as one used for an air conditioning system for vehicles, it is desirable from the viewpoint of safety to insulate between the terminals and terminal connection portion and the compressor body, thereby achieving a structure without the risk or with a reduced risk of an electrical short. In particular, because a motor incorporated within a compressor used for an air conditioning system for vehicles compresses refrigerant, which may be highly conductive, it is desirable to ensure that the refrigerant does not become the source of an electrical short.

In a known technology, the above-described insulation properties have been ensured by providing sufficient separation between the terminal connection portion and the compressor body. Nevertheless, because providing sufficient separation between the terminal connection portion and the compressor body may impede efforts to reduce compressor size, a method for obtaining the insulation properties by injecting a resin into the terminal connection portion also has been attempted. Further, Japanese Patent Application No. JP-A-2001-182655, the disclosure of which is incorporated herein by reference, describes a structure wherein a ceramic insulator is interposed between the terminal connection portion and the compressor body, the terminal connection portion is covered with a resin tube, and the resin tube is connected to the ceramic insulator.

In the structure in which a separation is created between a terminal connection portion and a compressor body, however, it becomes difficult to reduce the compressor's size, as described above. Further, in the structure in which a resin is injected into a terminal connection portion, time for injection of the resin and for curing of the resin is required, and it becomes difficult to improve the productivity and the assembling performance. Moreover, in the structure disclosed in Japanese Patent Application No. JP-A-2001-182655, because a terminal connection portion may include a ceramic insulator and a resin tube, it may be difficult to achieve an effective sealing of the connection portion due to a difference in thermal expansion coefficients between the insulator and tube materials. In addition, although a heat-shrink, resin tube may be used, if non-uniform shrinkage occurs, it also may be difficult to achieve an effective sealing of the connection portion.

SUMMARY OF THE INVENTION

Accordingly, it is an object of the present invention to provide a terminal connection structure of a motor incorporated within a compressor, which may exhibit superior insulation properties even if the compressor's size is reduced, and which may enjoy improved productivity and assembling performance of the compressor.

To achieve the foregoing and other objects, a terminal connection structure of a motor incorporated within a compressor for connecting feed terminals for a stator of a motor to the compressor, according to the present invention, may comprise a lid attached to a compressor body portion for securing external feed terminals with a hermetic seal, and provided with a resin character on an inner surface of the lid, through which the external feed terminals extend, and a resin housing containing wire-side terminals, which are provided at ends of wires connected to the stator and which are connected to the external feed terminals.

In a preferred embodiment of this terminal connection structure of a motor incorporated within a compressor, the compressor body portion attached to the lid may be cylindrical, and the resin housing may be inserted into the cylindrical compressor body portion.

Further, in a preferred embodiment of the terminal connection structure of a motor incorporated within a compressor, a fitting portion may be provided to engage the resin housing and the resin chamber to each other, and the resin housing may be deposed within the resin chamber.

Alternatively, in a preferred embodiment of the terminal connection structure of a motor incorporated within a compressor, the resin chamber may extend radially toward an axis of the compressor and be cylindrical, and the resin housing may be inserted into a cylindrical portion of the resin chamber. In this case, the resin housing, which is inserted into the cylindrical portion of the resin chamber may be enclosed by a seal plate, e.g., a resin plate, engaged to the cylindrical portion of the resin chamber. For example, the seal plate may engage a groove or grooves disposed in an interior surface of the cylindrical portion.

In such a terminal connection structure of a motor incorporated within a compressor according to the present invention, the terminal connection portion is sealed in a gas-tight condition against the external environment by the lid having a hermetic seal, and surrounded by the resin chamber provided on the lid and housing the resin housing containing the wire-side terminals. In particular, the terminal connection portion is surrounded by pre-molded resins, and even if it is difficult to create a significant separation between a compressor body portion and a terminal connection portion, superior insulation properties may be ensured, and both superior insulation properties and reduced compressor size may be achieved. Especially, because the terminal connection portion is surrounded by only resin, it becomes possible to remove the risk of the creation of a gap due to a difference in thermal expansion coefficients between surrounding materials.

Further, because the lid is adapted to incorporate external feed terminals beforehand and the resin housing is adapted to contain the wire-side terminals beforehand, a desired terminal connection may be created merely by engaging or attaching the lid and the resin housing at a predetermined positional relationship, and, therefore, the assembling performance may be significantly improved. Moreover, because it is not necessary to inject and cure the resin, in particular, the time for resin curing may be saved, and it may be possible to improve compressor manufacturing productivity, in particular, to shorten the time for assembly.

Thus, in the terminal connection structure of a motor incorporated within a compressor according to the present invention, the terminal connection portion may be surrounded by pre-molded resins, while maintaining a gas-tight condition against the external environment by the hermetic seal, and to ensure superior insulation properties. In particular, even if it is difficult to create a significant separation between the terminal connection portion and the compressor body portion, such as if miniaturization of the whole of the compressor is required, superior insulation properties may be ensured. Further, because the resin members surrounding the terminal connection portion are pre-molded, a desired terminal connection may be achieved merely by engaging members of both sides to each other, and therefore, the assembling performance may be significantly improved. Moreover, because resin injection and curing become unnecessary, the productivity also may be significantly improved.

Further objects, features, and advantages of the present invention will be understood from the following detailed description of preferred embodiments of the present invention with reference to the accompanying figures.

BRIEF DESCRIPTION OF THE DRAWINGS

Embodiments of the invention now are described with reference to the accompanying figures, which are given by way of example only, and are not intended to limit the present invention.

DETAILED DESCRIPTION OF PREFERRED EMBODIMENTS

The present invention may be applied to both motor-driven compressors and hybrid compressors. Hereinafter, however, embodiments of the present invention will be described mainly with respect to hybrid compressors.

Figure 1:
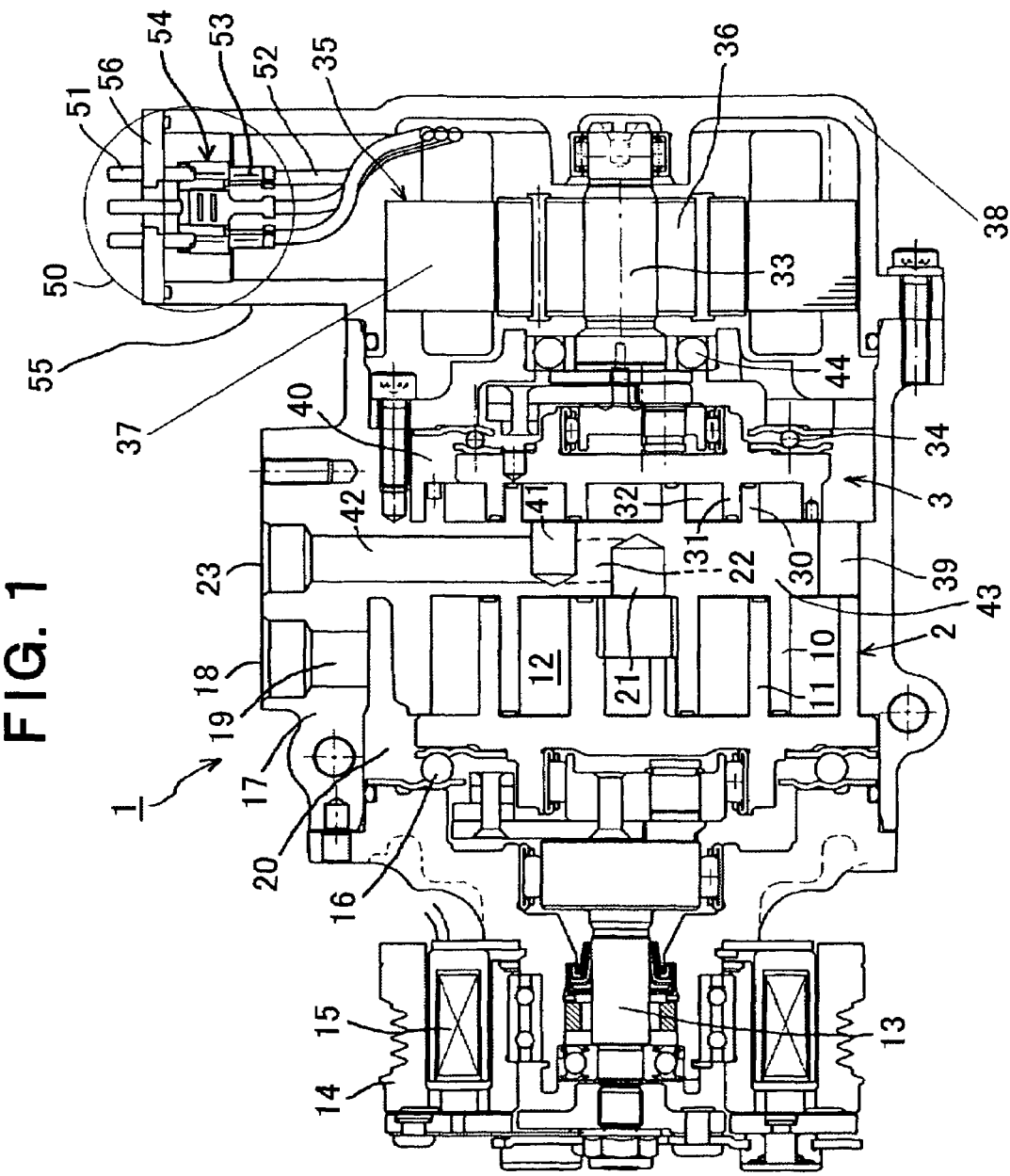
FIG. 1 is a cross-sectional view of a hybrid compressor having a terminal connection structure of a motor incorporated within a compressor, according to the present invention.

FIG. 1 depicts a scroll-type, hybrid compressor 1 according to a first embodiment of the present invention. Hybrid compressor 1 comprises a first compression mechanism 2 and a second compression mechanism 3. First compression mechanism 2 comprises a fixed scroll 10; an orbital scroll 11, which engages fixed scroll 10 to form a plurality of pairs of fluid pockets 12; a drive shaft 13, which engages orbital scroll 11 and imparts an orbital movement to orbital scroll 11; an electromagnetic clutch 15 for controlling the transmission of a drive force between drive shaft 13 and a pulley 14 to which a drive force from a drive source for running a vehicle (not shown) is transmitted; a ball coupling 16 for preventing the rotation of orbital scroll 11, and a suction port 18 formed on a casing 17. Fluid, e.g., refrigerant or refrigerant gas, to be compressed drawn from suction port 18 to suction chamber 20 through suction passage 19 is drawn into fluid pockets 12, and the fluid in fluid pockets 12 is compressed as fluid pockets 12 are moved toward the center of fixed scroll 10, while their volumes are reduced. A discharge hole 21 is formed through a central portion of fixed scroll 10, and the compressed fluid is discharged to a high pressure-side of an external refrigeration circuit from discharge hole 21 through discharge passage 22 and discharge port 23.

Second compression mechanism 3 comprises a fixed scroll 30; an orbital scroll 31, which engages fixed scroll 30 to form a plurality of pairs of fluid pockets 32; a drive shaft 33, which engages orbital scroll 31 and imparts an orbital movement to orbital scroll 31; and a ball coupling 34 for preventing the rotation of orbital scroll 31. An electric motor 35 is incorporated into compressor 1 to drive drive shaft 33 of second compression mechanism 3. Motor 35 has a rotor 36 engaged by drive shaft 33 and a stator 37 housed within a stator housing 38 which with casing 17 forms a compressor body. The whole of motor 35 is contained in this stator housing 38. In this second compression mechanism 3, fluid to be compressed, which is drawn from suction port 18 into suction chamber 20 of first compression mechanism 2, also may be drawn into a suction chamber 40 of second compression mechanism 3 through communication passage 39. The fluid is drawn into fluid pockets 32, and the fluid in fluid pockets 32 is compressed as fluid pockets 32 are moved toward the center of fixed scroll 30, while their volumes are reduced. A discharge hole 41 is formed through a central portion of fixed scroll 30, and the compressed fluid is discharged to a high pressure side of external refrigeration circuit from discharge hole 41 through discharge passage 42 and discharge port 23.

In this embodiment, fixed scroll 10 of first compression mechanism 2 and fixed scroll 30 of second compression mechanism 3 are disposed back-to-back, and both fixed scrolls 10 and 30 are formed as a two-sided, fixed scroll member 43.

In a case in which only first compression mechanism 2 of hybrid compressor 1 is operated, electricity is not supplied to motor 35 for driving second compression mechanism 3, and motor 35 is not rotated. Therefore, second compression mechanism 3 does not operate. In a case in which hybrid compressor 1 is driven only by motor 35, motor 35 is activated and rotates, the rotation of motor 35 is transmitted by drive shaft 33 to second compression mechanism 3, and an orbital movement is imparted to orbital scroll 31 via drive shaft 33. At that time, electricity is not supplied to electromagnetic clutch 15 of first compression mechanism 2, and the rotation of a drive source for running a vehicle is not transmitted to first compression mechanism 2. Therefore, first compression mechanism 2 does not operate. In a case in which both compression mechanisms 2 and 3 are driven simultaneously, the drive force of a drive source for running a vehicle is transmitted to orbital scroll 11 of first compression mechanism 2, and motor 35 is activated and its drive force is transmitted to orbital scroll 31 of second compression mechanism 3.

In hybrid compressor 1 thus constructed, fluid drawn into suction chamber 40 of second compression mechanism 3 driven by motor 35, and lubricant, such as machine oil contained in the fluid, may enter into stator housing 38 through portions of ball coupling 34 and bearing 44. Therefore, liquid refrigerant and lubricant are liable to collect around second compression mechanism 3, they also are liable to collect in stator housing 38, and, if the collected refrigerant and lubricant come in contact with electrical conductors, the collected refrigerant and lubricant may cause an electric short at a terminal connection portion.

In FIG. 1, the terminal connection structure is constructed as follows. Terminal portion 50 of motor 35 is disposed on a radial portion (or a side portion) of stator housing 38. This terminal portion 50 has external feed terminals 51 for supplying electricity from outside to motor 35, and wire-side terminals 53 which are provided at ends of wires 52 connected to stator 37 of motor 35, and both terminals 51 and 53 form terminal connection portion 54. In this embodiment, a compressor body portion 55 is formed as a cylindrical form extending radially at a radial potion of stator housing 38, and terminal connection portion 54 is disposed within a compressor body portion 55. A lid 56 securing external feed terminals 51 is attached to compressor body portion 55, and by lid 56, terminal connection portion 54 is sealed against the external environment.

Figure 2:
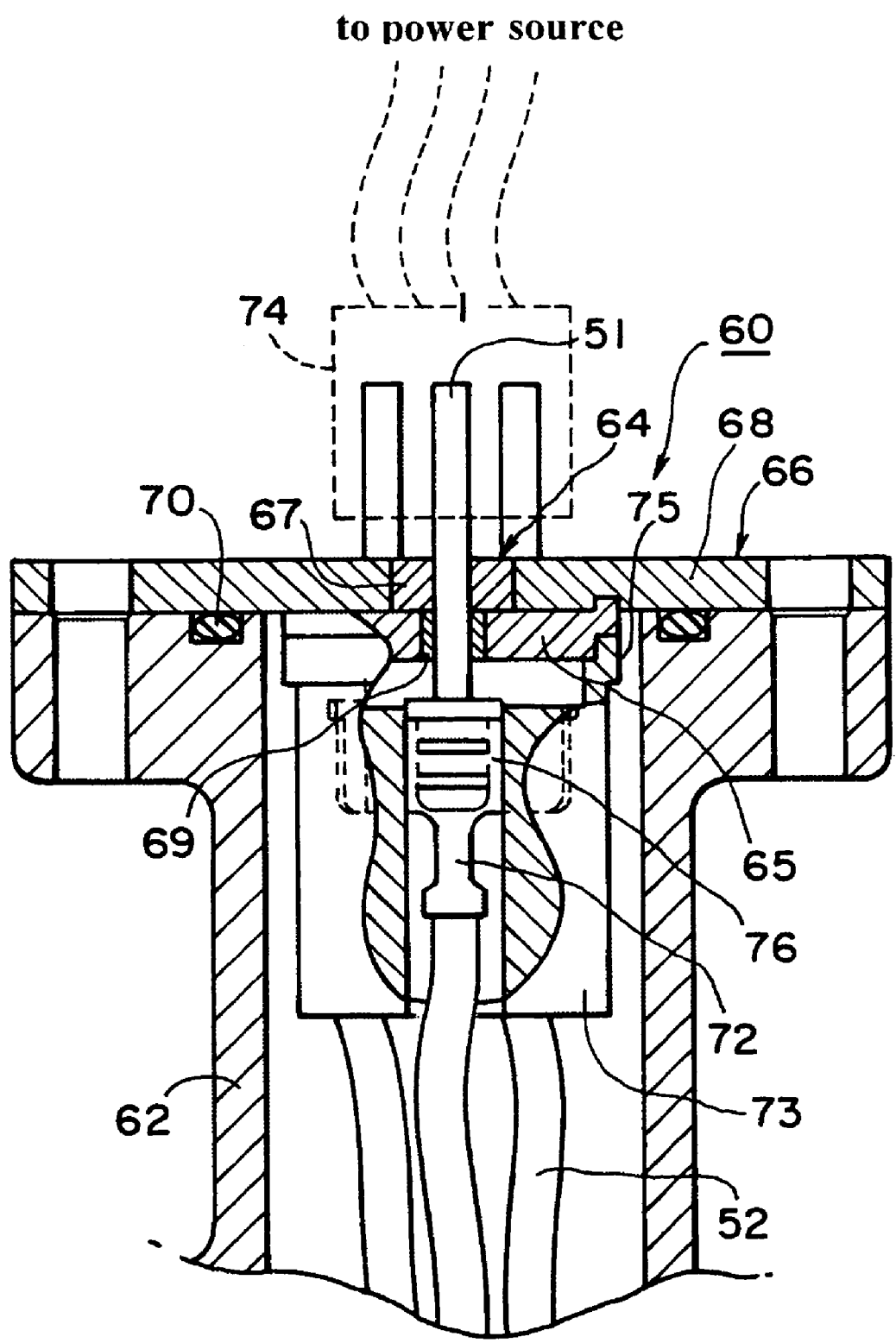
FIG. 2 is an enlarged, partial, cross-sectional view of the terminal connection structure, according to a first embodiment of the present invention.

In this embodiment, the terminal connection structure is formed, as depicted in FIG. 2. In terminal connection structure 60 depicted in FIG. 2, a lid 66 secures external feed terminals 51 for feeding electricity from outside the compressor through a hermetic seal 64 and is provided with a resin disc 65, e.g., a resin chamber, through which external feed terminals 51 extend, on the inner surface of lid 66. Lid 66 is attached to the top portion of cylindrical, compressor body portion 62 of stator housing 38. In this embodiment, hermetic seal 64 is formed, so that a seal portion 67 composed of a glass or a ceramic is provided, and external feed terminals 51 are insulated from a metal lid body 68, and in seal portion 67. The inside of the compressor is sealed in a gas-tight condition against outside. Resin disc 65 is pre-molded at a position inside of the compressor, and lid 66, resin disc 65 and external feed terminals 51 extending therethrough, are formed beforehand as a single part. Further, in this embodiment, a resin filler 69 (for example, an epoxy resin) is injected into a central portion of resin disc 65 in order to fill gaps between resin disc 65 and external feed terminals 51 extending therethrough. This resin injection is also carried out before attachment, and as described above, these members are formed as a single part.

In this embodiment, in which motor 35 is driven by supplying a three-phase current, three external feed terminals 51 are provided, and three external feed terminals 51 are secured by the structure depicted in FIG. 2, respectively. Lid 66 is attached to the top portion of cylindrical compressor body portion 62 via an O-ring 70, and the attachment of lid 66 is carried out by fastening bolts or the like (not shown).

In cylindrical, compressor body portion 62, a resin housing 73 is provided, and resin housing 73 contains wire-side terminals 72 which are provided at ends of wires 51 connected to stator 37 and which are connected to external feed terminals 51. Three wire-side terminals 72 are provided, and respective wire-side terminals 72 are contained and fixed in resin housing 73 at positions corresponding to external feed terminals 51. Resin housing 73 containing these wire-side terminals 72 is formed beforehand as a single part. Thus, power may be supplied by respective external feed terminals 51 if external feed terminals 51 are connected to a power source (not shown) via a connector 74.

In this embodiment, a stepped periphery portion of resin disc 65 and a corresponding, outer circumferential portion of resin housing 73 define an engaging portion 75 for engaging disc 65 to housing 73. By fitting resin housing 73 into resin disc 65 via engaging portion 75, resin housing 73 is fixed at a predetermined position relative to resin disc 65, and respective wire-side terminals 72 contained in resin housing 73 are connected to corresponding external feed terminals 51, thereby forming a predetermined, terminal connection portion 76.

In such a terminal connection structure 61, terminal connection portion 76 is surrounded by resin disc 65 and resin housing 73, namely, surrounded entirely by resin components, and superior insulation properties may be obtained with respect to the compressor body. Further, because the resin components surrounding terminal connection portion 76 are pre-molded, the dimensional accuracy is superior, and even if miniaturization is planned (i.e., even if it is difficult to obtain significant separation between terminal connection portion 76 and the compressor body), desired insulation properties may be ensured. Moreover, because a predetermined terminal connection may be achieved by engaging resin housing 73 with resin disc 65, the assembling performance may be significantly improved. Further, because both resin injection and curing are not necessary, improved productivity, especially, shortening of assembly time, may be possible.

Figure 3:
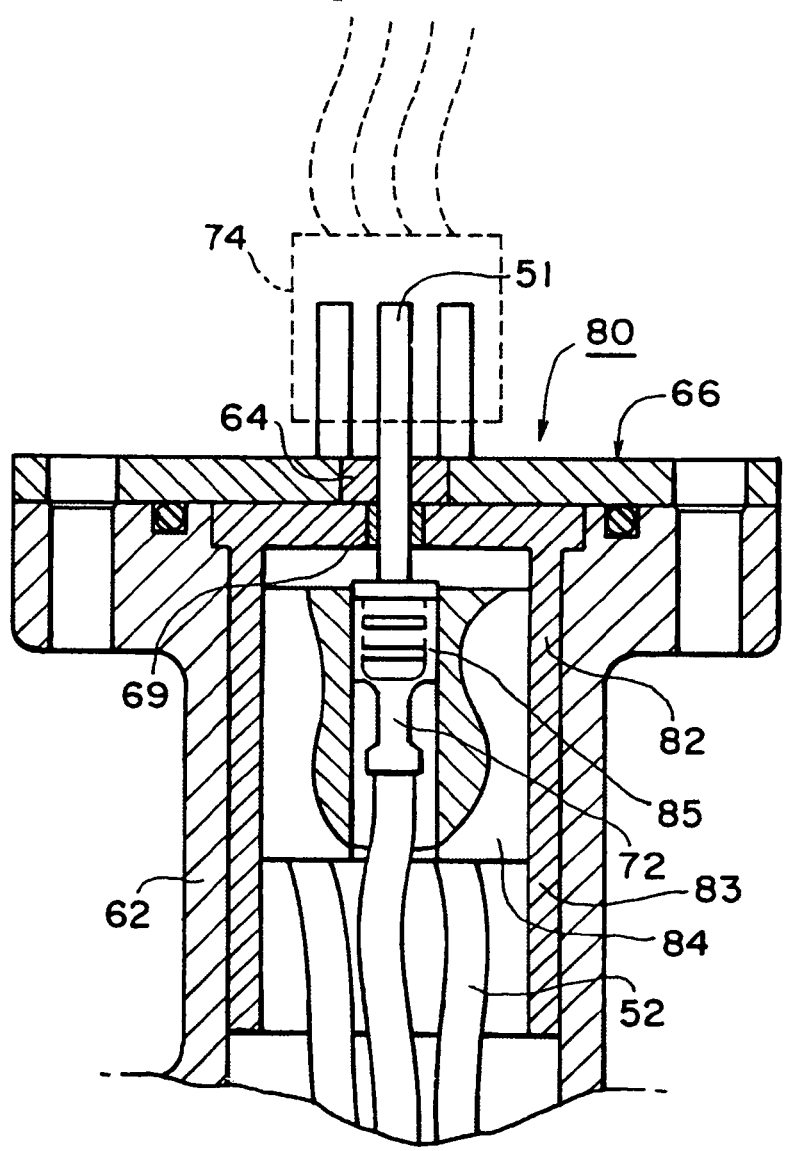
FIG. 3 is an enlarged partial, cross-sectional view of a terminal connection structure, according to a second embodiment of the present invention.

FIG. 3 depicts a terminal connection structure 80 according to a second embodiment of the present invention. In this embodiment, a radial, resin chamber 82 cylindrically extends toward the axis of the compressor, and a resin housing 84 containing wire-side terminals 72 is inserted into cylindrical resin chamber portion 83. In such a structure, terminal connection portion 85 is covered with a double resin structure formed by cylindrical, resin chamber portion 83 and resin housing 84 relatively to cylindrical, compressor body portion 62, and superior insulation properties may be obtained. The other structures, operation, and advantages are substantially same as those in the embodiment depicted in FIG. 2.

Figure 4:
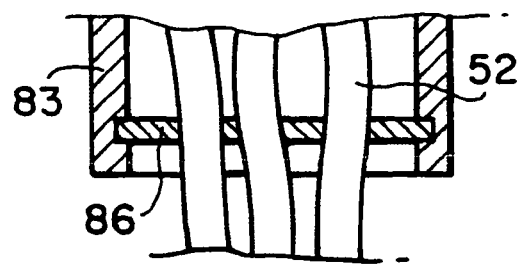
FIG. 4 is a partial, cross-sectional view of a terminal connection structure, according to a modification of the embodiment depicted in FIG. 3.

Further, as depicted in FIG. 4, in a case of forming resin chamber 82 with cylindrical resin chamber portion 83, a seal plate 86, e.g., a resin seal plate, may be provided at an entrance side of cylindrical resin chamber portion 83 for resin housing 84 to enclose the resin housing 84 within cylindrical resin chamber portion 83. In such a modified, second embodiment, it is possible to seal terminal connection portion 85 relative to fluid and lubricant stored in the compressor, thereby obtaining further improved insulation properties. The other structures, operation, and advantages are substantially same as those in the embodiment depicted in FIG. 2.

Although the above embodiments have been described with respect to a hybrid compressor, structures according to the present invention may be applied to other motor-driven compressors. Further, structures according to the present invention may be applied to motors incorporated within compressors, such as motor-driven compressors and hybrid compressors, and it may be particularly suitable for application to compressors operated under a high-voltage.

Although embodiments of the present invention have been described in detail herein, the scope of the invention is not limited thereto. It will be appreciated by those skilled in the art that various modifications may be made to these embodiments without departing from the scope of the invention. Accordingly, the embodiments disclosed herein are only exemplary. It is to be understood that the scope of the invention is not to be limited thereby, but is to be determined by the claims which follow.

What is claimed is:

1. A terminal connection structure of a motor incorporated within a compressor for connecting feed terminals for a stator of said motor to said compressor, said structure comprising:

a lid attached to a compressor body portion for securing external feed terminals with a hermetic seal, and provided with a resin chamber on an inner surface of said lid, through which said external feed terminals extend; and a resin housing containing wire-side terminals, which are provided at ends of wires connected to said stator and which are connected to said external feed terminals, wherein at least a portion of said resin chamber extends radially toward an axis of said compressor, and said resin housing is disposed within said portion of said resin chamber.

2. The terminal connection structure of claim 1, wherein further comprising a seal plate engaged to a circumferential groove on an interior surface of said cylindrical portion of said resin chamber, thereby enclosing said resin housing within said resin chamber.

3. The terminal connection structure of claim 1, wherein at least the portion of said resin chamber that extends radially toward an axis of said compressor is cylindrical.

4. A compressor comprising a motor and a terminal connection structure of said motor for connecting feed terminals for a stator of said motor to said compressor, said structure comprising:

a lid attached to a compressor body portion for securing external feed terminals with a hermetic seal, and provided with a resin chamber on an inner surface of said lid, through which said external feed terminals extend; and a resin housing containing wire-side terminals, which are provided at ends of wires connected to said stator and which are connected to said external feed terminals wherein at least a portion of said resin chamber extends radially toward an axis of said compressor, and said resin housing is disposed within said portion of said resin chamber.

5. The compressor of claim 4, wherein farther comprising a seal plate engaged to a circumferential groove on an interior surface of said cylindrical portion of said resin chamber, thereby enclosing said resin housing within said resin chamber.

6. The compressor of claim 4, wherein at least the portion of said resin chamber that extends radially toward an axis of said compressor is cylindrical.

* * * * *